US011969862B2

(12) United States Patent
Andersen

(10) Patent No.: US 11,969,862 B2
(45) **Date of Patent: *Apr. 30, 2024**

(54) MAGNETIC BIT HOLDER WITH AUTOMATIC RETRACTING GUIDE SLEEVE

(71) Applicant: Matthew Andersen, Omaha, NE (US)

(72) Inventor: Matthew Andersen, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,950

(22) Filed: Jul. 11, 2022

(65) Prior Publication Data

US 2023/0097768 A1 Mar. 30, 2023

Related U.S. Application Data

(63) Continuation of application No. 16/773,686, filed on Jan. 27, 2020, now Pat. No. 11,383,359.

(60) Provisional application No. 62/882,661, filed on Aug. 5, 2019.

(51) Int. Cl.
*B25B 23/00* (2006.01)

(52) U.S. Cl.
CPC ........ *B25B 23/005* (2013.01); *B25B 23/0035* (2013.01)

(58) Field of Classification Search
CPC .............. B25B 23/005; B25B 23/0021; B25B 23/0035; B25B 23/0071; B25B 23/02; B25B 23/08; B25B 23/101; B25B 23/12; B25B 15/00; B25B 15/002
See application file for complete search history.

(56) References Cited

U.S. PATENT DOCUMENTS

| | | | | |
|---|---|---|---|---|
| 8,733,216 | B1 | 5/2014 | Cantlon | |
| 9,156,147 | B2 | 10/2015 | Peters et al. | |
| 9,943,946 | B2 * | 4/2018 | Peters | B25B 23/0035 |
| 10,093,005 | B2 | 10/2018 | Zhang et al. | |
| 10,556,329 | B2 * | 2/2020 | Peters | B23B 31/1071 |
| 11,383,359 | B1 * | 7/2022 | Andersen | B25B 23/005 |
| 2008/0216618 | A1 | 9/2008 | Chen | |
| 2016/0271768 | A1 | 9/2016 | Zhang et al. | |
| 2017/0120427 | A1 | 5/2017 | Tsai | |

FOREIGN PATENT DOCUMENTS

WO 2021026244 A1 2/2021

OTHER PUBLICATIONS

PCT Search Report for PCT Application No. PCT/US20/450201 dated May 12, 2021, 1 pages.

* cited by examiner

*Primary Examiner* — David B. Thomas
(74) *Attorney, Agent, or Firm* — Suiter Swantz IP

(57) ABSTRACT

A magnetic driver bit holder may include, but is not limited to: a drive portion including: a shaft portion including: a recess disposed in an end portion of the shaft portion; and one or more magnets disposed within the shaft portion, and a sleeve portion including: a hollow tube dimensioned such that the shaft portion may be inserted into the hollow tube; and a ring magnet coupled to an end portion of the hollow tube.

4 Claims, 5 Drawing Sheets

MAGNETIC BIT HOLDER WITH AUTOMATIC RETRACTING GUIDE SLEEVE

PRIORITY

The present application constitutes a continuation application of and claims priority to U.S. patent application Ser. No. 16/783,686, filed on Jan. 27, 2020 entitled MAGNETIC BIT HOLDER WITH AUTOMATIC RETRACTING GUIDE SLEEVE, which claims priority under 35 U.S.C. § 119(e) to U.S. Provisional Patent Application Ser. No. 62/882,661, entitled MAGNETIC BIT HOLDER FOR DRILLS WITH AN AUTOMATIC RETRACTING GUIDE SLEEVE, filed Aug. 5, 2019, naming Matthew Andersen as an inventor, which is incorporated herein by reference in the entirety.

SUMMARY OF THE INVENTION

A magnetic bit driver may include, but is not limited to: a drive portion including: a shaft portion including: a recess disposed in an end portion of the shaft portion; and one or more magnets disposed within the shaft portion, and a sleeve portion including: a hollow tube dimensioned such that the shaft portion may be inserted into the hollow tube; and a ring magnet coupled to an end portion of the hollow tube.

DETAILED DESCRIPTION

Figure 1:
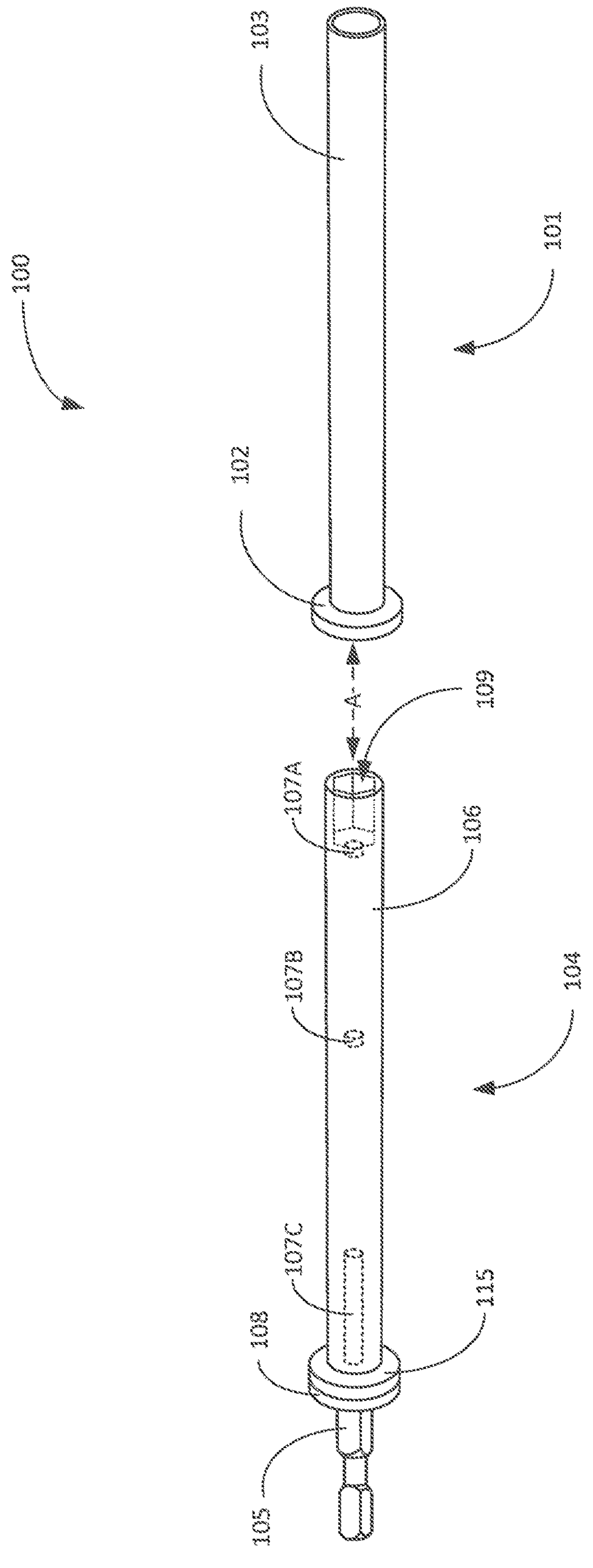
FIG. 1 illustrates a magnetic drive bit holder system.

Referring to FIG. 1, an exploded view of a drive bit holder 100 is shown.

The drive bit holder 100 may include a guide sleeve 101 is shown. The guide sleeve 101 may include an axially polarized ring magnet 102 coupled to a hollow sleeve portion 103. The sleeve portion 103 may be constructed of a ferromagnetic material (e.g. a ferromagnetic metal) for purposes of magnetic attraction.

A separate drive portion 104 may include a hexagonal (or any other shaped) shank 105 configured to be received and retained by a chuck of a driver (not shown). The drive portion 104 may be constructed of a ferromagnetic material (e.g. a ferromagnetic metal) for purposes of strength and magnetic attraction. The drive portion 104 may further include a cylindrical shaft 106. The cylindrical shaft 106 may be constructed of a non-ferromagnetic material (e.g. aluminum) so as to prevent magnetic attraction that would inhibit the free sliding of the guide sleeve 101 relative to the drive portion 104.

The cylindrical shaft 106 may include one or more imbedded magnets 107 (e.g. magnet 107A, magnet 107B, and magnet 107C).

The drive portion 104 may further include a shoulder portion 108 having a diameter greater than the cylindrical shaft 106 to provide a backstop to motion of the guide sleeve 101 as will be further described below. A shock absorbing washer or spacer 115 may be disposed around the cylindrical shaft 106 and adjacent to the shoulder portion 108 to prevent damage from the repeated collision of the end of the guide sleeve 101 and the shoulder portion 108 of the drive portion 104 during operation.

The drive portion 104 may further include a drive bit receiving recess 109 configured to receive and hold a shank (e.g. a standard hex shank) of a drive bit (e.g. a Phillips®, flathead, hex, or other drive bit, not shown).

These components of the drive bit holder 100 may be assembled such that drive portion 104 is removably insertable (as shown via arrow A) within the guide sleeve 101 via an aperture formed in the ring magnet 102 and an open end of the sleeve portion 103. The guide sleeve 101 may slide along the drive portion 104 until it the ring magnet 102 contacts the shoulder portion 108 at the base of the drive portion 104.

Figure 2A:
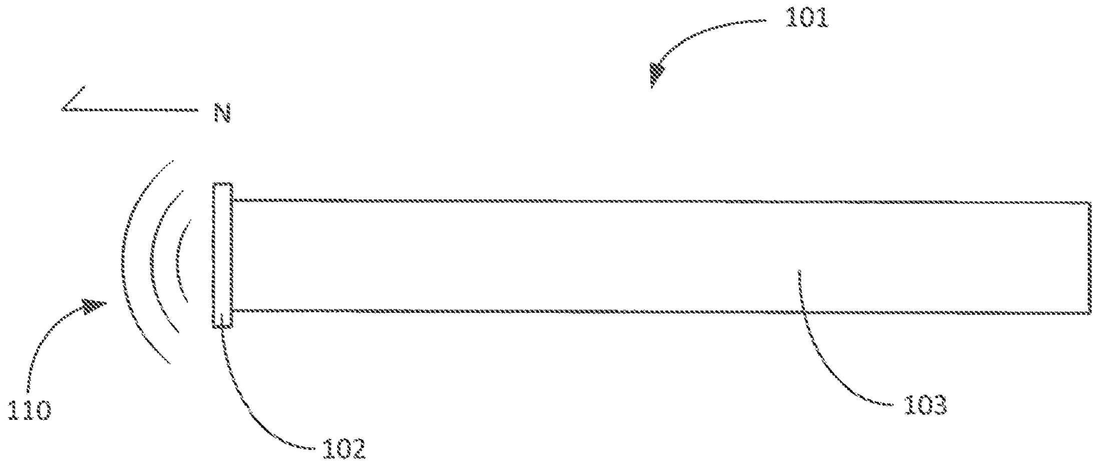
FIG. 2A illustrates a magnetic drive bit holder system.
Figure 2B:
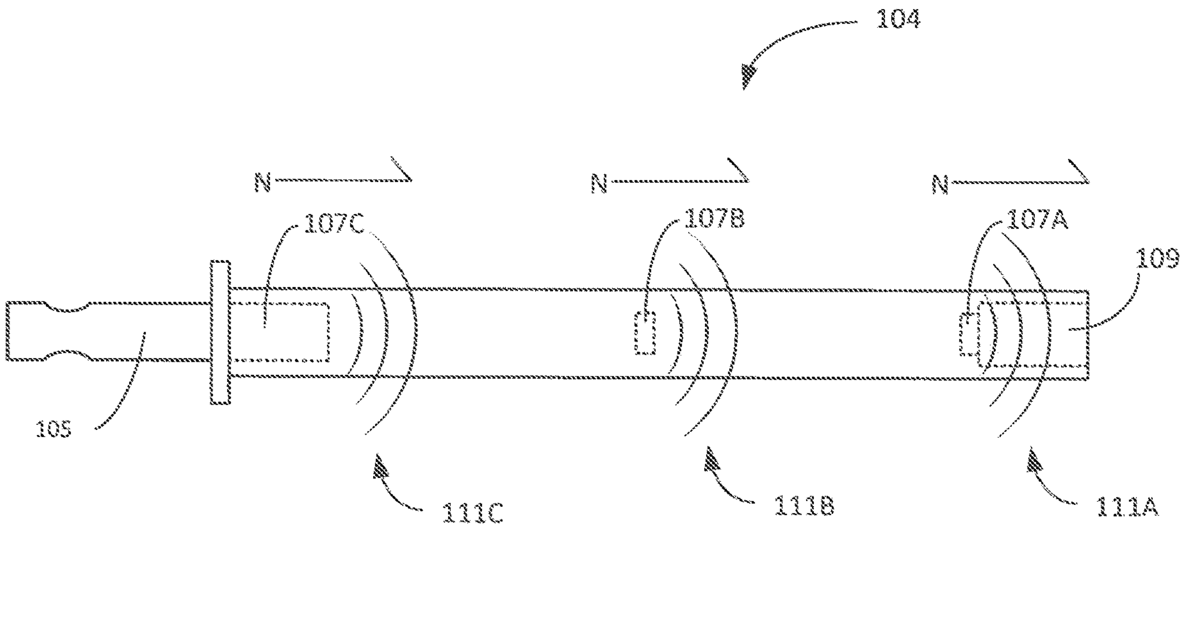
FIG. 2B illustrates a magnetic drive bit holder system.

Referring to FIGS. 2A-2B, interactions between the ring magnet 102 and the magnets 107 located internal to the cylindrical shaft 106 may serve to create both acceleration of movement and/or resistance to movement of the guide sleeve 101 so as to move between and retain the guide sleeve 101 at one or more intermedial (e.g. fully extended, partially retracted) or retracted positions relative to the drive portion 104 such that the guide sleeve 101 can encompass a fastener to be driven into a surface by a driver using a drive bit disposed in the drive bit receiving recess 109 of the drive bit holder 100.

As shown in FIGS. 2A and 2B, the direction of a magnetic field 110 (e.g. a North magnetic field) of ring magnet 102 is shown as opposite facing relative to a magnetic field 111A, magnetic field 111B, and magnetic field 111C (e.g. a North magnetic field) of magnet 107A, magnet 107B and magnet 107C, respectively within the cylindrical shaft 106.

In one embodiment, direct contact of the ring magnet 102 with the sleeve portion 103 may relocate the center of the magnetic field 110 of the of the ring magnet 102 from its own physical center to some small distance into the sleeve portion 103. Similarly, direct contact of the magnet 107C located within near the base of the cylindrical shaft 106 with the shank 105 relocates the magnetic center of the magnetic field 111C of the magnet 107C a small distance into the shank 105.

Figure 3A:
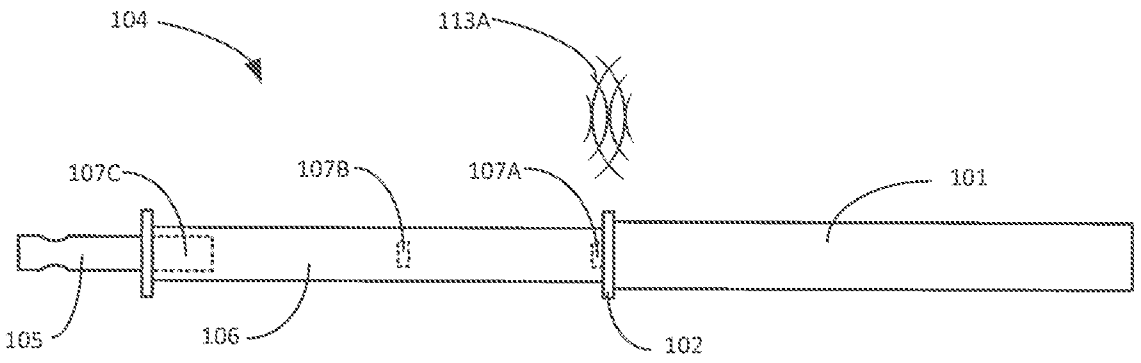
FIG. 3A illustrates a magnetic drive bit holder system.
Figure 3B:
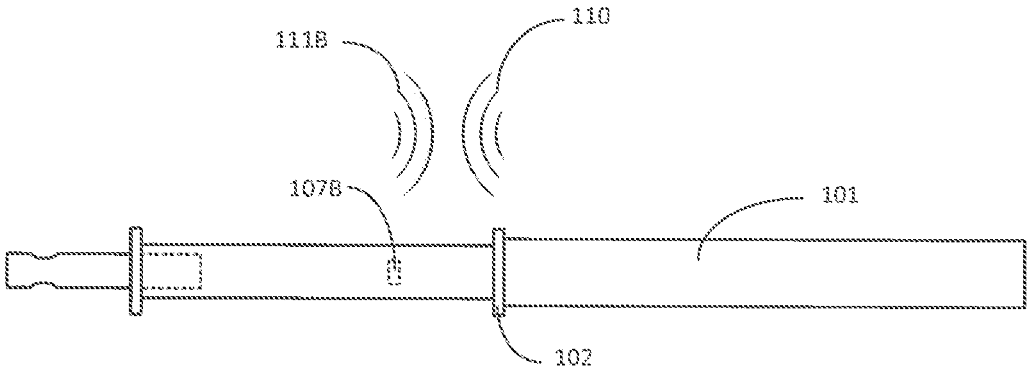
FIG. 3B illustrates a magnetic drive bit holder system.

Referring to FIGS. 3A-3B, upon sliding movement of the guide sleeve 101 along the length of the cylindrical shaft 106 of the drive portion 104, the overlapping magnetic fields of the ring magnet 102 of the guide sleeve 101 and the various magnets 107 located within the cylindrical shaft 106 of the drive portion 104 attempt to either repel or align their respective magnetic centers according to their relative positions. Referring to FIG. 3A, the tendency of the cooperative overlapping magnetic fields of the ring magnet 102 and various magnets 107 (e.g. magnetic interaction 113A with magnet 107A) located within the cylindrical shaft 106 to align may serve to periodically retract the guide sleeve 101 with consistent and persistent force (e.g. a force sufficient to retract the weight of the guide sleeve 101 when raised perpendicular to the pull of gravity).

Referring to FIG. 3B, as noted above, the polarity of the magnetic field 110 of the ring magnet 102 on the guide sleeve 101 and the polarity of the magnetic field 111 of the various magnets 107 located within the cylindrical shaft 106 may be oriented in opposite orientations thereby creating a threshold of magnetic repulsion that must be overcome to reach a position that allows the magnetic centers to attempt to align at, for example, magnet 107B. The force necessary to overcome this magnetic repulsion threshold may serve to prevent premature retraction (e.g. as could occur due to the gravity pulling upon the sleeve when the drive bit holder 100 is facing an upward position.

Figure 4A:
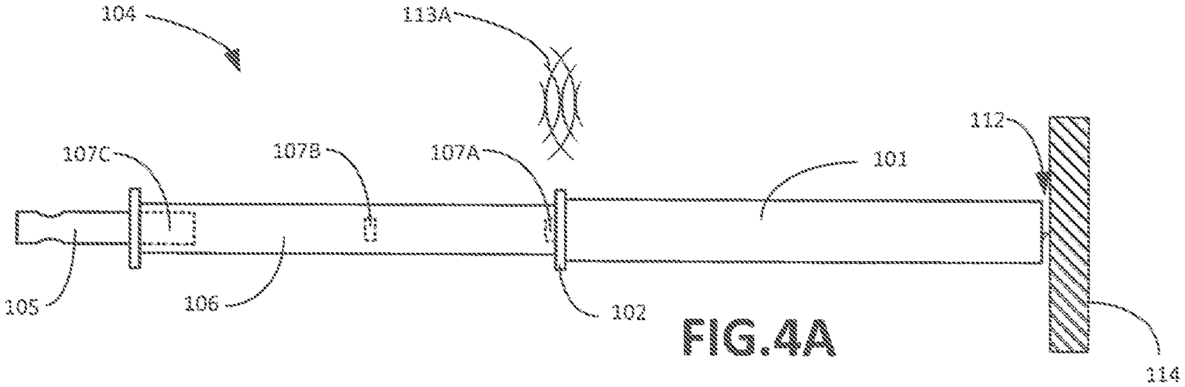
FIG. 4A illustrates a magnetic drive bit holder system.

Specifically, as shown in FIGS. 4A-4D, progressive movements of the guide sleeve 101 along the length of the cylindrical shaft 106 may induce alternating repulsive and attractive magnetic interactions between the ring magnet 102 of the guide sleeve 101 and the magnets 107 of the cylindrical shaft 106 to either retract or retain the guide sleeve 101 relative to the cylindrical shaft 106. As shown in FIG. 4A, an initial state of the drive bit holder 100 is shown. In the initial state, a fastener 112 may be inserted in to the guide sleeve 101 where it may be engaged by a drive bit 116 disposed within the drive bit receiving recess 109 of the cylindrical shaft 106 as shown in FIG. 1. The guide sleeve 101 may be maintained in this initial state via the cooperative magnetic interaction 113A of the ring magnet 102 of the guide sleeve 101 and the first magnet 107A of the cylindrical shaft 106 of the drive portion 104.

Figure 4B:
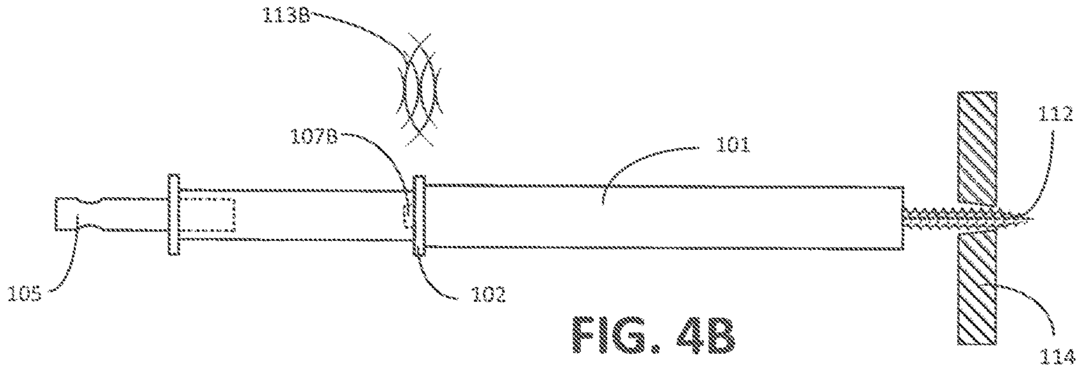
FIG. 4B illustrates a magnetic drive bit holder system.

As shown in FIG. 4B, upon partial insertion of the fastener 112 into a surface 114 (e.g. via a driver engaging and rotating the shank 105), the guide sleeve 101 will contact the surface (as shown in FIG. 4A) and will be pushed along the cylindrical shaft 106 of the drive portion 104 until such point that the cooperative magnetic interaction 113B of the ring magnet 102 of the guide sleeve 101 with second magnet 107B of the cylindrical shaft 106 of the drive portion 104 is sufficient to overcome the magnetic interaction 113A of the first magnet 107A, causing the guide sleeve 101 to snap into an intermediary position associated with the second magnet 107B.

Figure 4C:
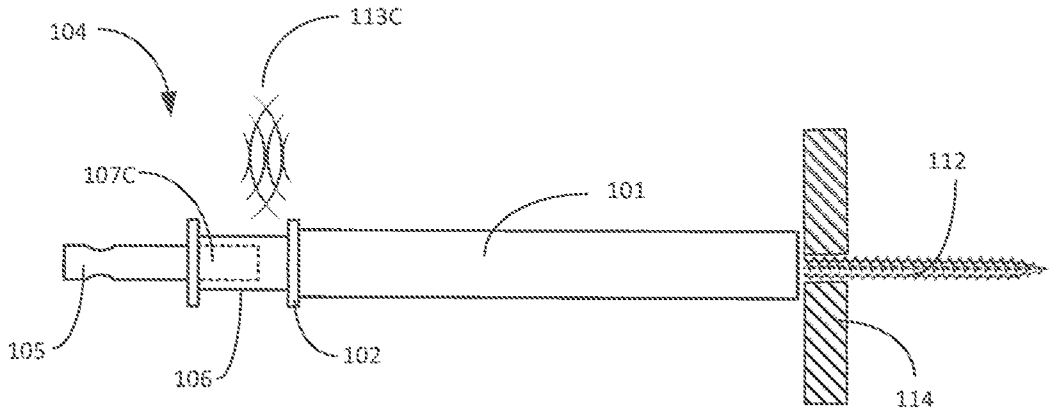
FIG. 4C illustrates a magnetic drive bit holder system.

As shown in FIG. 4C, upon further insertion of the fastener 112 into the surface 114, the guide sleeve 101 will contact the surface 114 and will slide along the cylindrical shaft 106 of the drive portion 104 until such point that the cooperative magnetic interaction 113C of the ring magnet 102 of the guide sleeve 101 with third magnet 107C of the cylindrical shaft 106 of the drive portion 104 is sufficient to overcome the magnetic interaction 113B with the second magnet 107B, causing the guide sleeve 101 to snap into an intermediary position associated with the third magnet 107C.

Figure 4D:
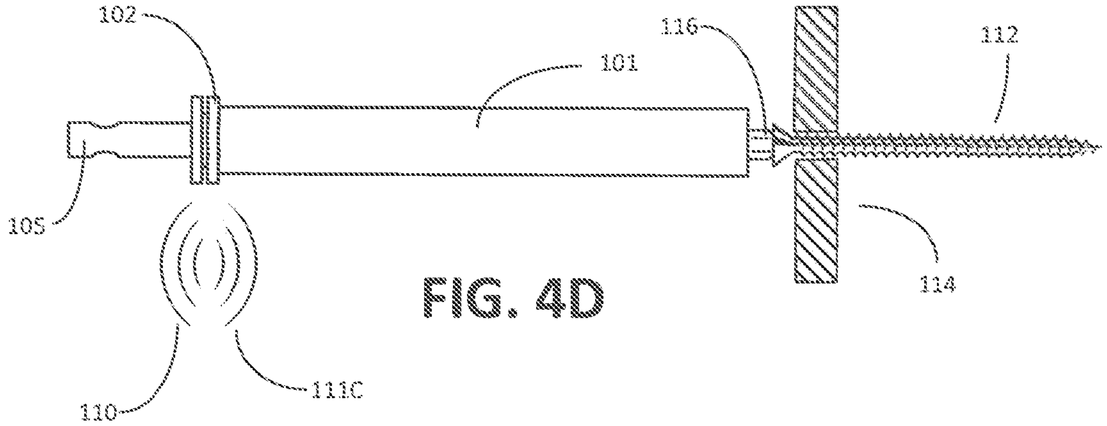
FIG. 4D illustrates a magnetic drive bit holder system.

As shown in FIG. 4D, the relative magnetic field configurations of magnetic field 110 of the ring magnet 102 and magnetic field 111C the third magnet 107C cause the guide sleeve 101 to snap into a fully retracted position where the ring magnet 102 is adjacent to the shoulder portion 108 of the drive portion 104 prior to complete insertion of the fastener 112 into the surface. Because the guide sleeve 101 snaps into the fully retracted position prior to complete insertion of the fastener 112 into the surface, the remaining portion of the fastener 112 which has not been inserted into the surface (e.g. the fastener head) becomes visible to a user thereby allowing the user to cease driving of the fastener at an appropriate time to avoid over-driving the fastener 112 into the surface.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are, in fact, covered by both this disclosure and the associated claims. It is indeed intended that the scope of this disclosure should be determined by a proper legal interpretation and construction of the disclosure, including equivalents, as understood by those of skill in the art relying upon the complete disclosure present at the time of filing.

What is claimed:

1. A magnetic driver bit holder comprising:

a drive portion including:

a shaft portion having a recess disposed in an end of the shaft portion;

a shoulder portion; and a shank portion receivable within a driver; and wherein at least one of the shoulder portion or the shank portion has at least one of a magnetic or magnetizable construction, and a sleeve portion-dimensioned such that the shaft portion may be inserted into the sleeve portion; and a magnet coupled to the sleeve portion, wherein the magnet coupled to the sleeve portion and the at least one of the shoulder portion or the shank portion having at least one of a magnetic or magnetizable construction are configured such that a magnetic field of the magnet coupled to the sleeve portion and a magnetic field of the at least one of the shoulder portion or the shank portion having at least one of a magnetic or magnetizable construction interact to retain the end of the sleeve portion against the shoulder portion.

2. The magnetic driver bit holder of claim 1, wherein the shoulder portion is configured to prevent retraction of the sleeve portion past the shoulder portion.

3. A magnetic driver bit holder comprising:

a drive portion including:

a shaft portion having a recess disposed in an end of the shaft portion;

a shoulder portion; and a shank portion receivable within a driver; and wherein at least one of the shoulder portion or the shank portion has at least one of a magnetic or magnetizable construction, and a sleeve portion-dimensioned such that the shaft portion may be inserted into the sleeve portion; and a magnet coupled to the sleeve portion, wherein at least one of the shoulder portion or the shank portion has at least one of a magnetic or magnetizable construction having a colinear polarity with respect to an axis of the shaft portion; and wherein the magnet coupled to the sleeve portion has a colinear and opposite polarity with respect to the axis of the shaft when the shaft is inserted into the sleeve portion.

4. A magnetic driver bit holder comprising:

a drive portion including:

a shaft portion having a recess disposed in an end of the shaft portion;

a shoulder portion; and a shank portion receivable within a driver; and wherein at least one of the shoulder portion or the shank portion has at least one of a magnetic or magnetizable construction, and a magnet disposed at an intermedial location within the shaft portion;

a sleeve portion-dimensioned such that the shaft portion may be inserted into the sleeve portion; and a magnet coupled to the sleeve portion wherein the magnet coupled to the sleeve portion and the magnet disposed within the shaft portion are configured such that a magnetic field of the magnet coupled to the sleeve portion and a magnetic field of the magnet disposed within the shaft portion interact to retain the magnet coupled to the sleeve portion proximate to the intermedial location.

* * * * *